US006989964B2

(12) United States Patent
Hsu et al.

(10) Patent No.: US 6,989,964 B2
(45) Date of Patent: Jan. 24, 2006

(54) MAGNETIC HEAD HAVING A POLE PIECE WITH A DOUBLE PEDESTAL STRUCTURE

(75) Inventors: Yimin Hsu, Sunnyvale, CA (US); Gautam Mohan Khera, Morgan Hill, CA (US); Yong Shen, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 131 days.

(21) Appl. No.: 10/462,535

(22) Filed: Jun. 16, 2003

(65) Prior Publication Data

US 2004/0252410 A1    Dec. 16, 2004

(51) Int. Cl.
    *G11B 5/147* (2006.01)
(52) U.S. Cl. ....................................... 360/126
(58) Field of Classification Search ............. 360/126, 360/125, 121, 128, 313
See application file for complete search history.

(56) References Cited

U.S. PATENT DOCUMENTS

| 5,283,942 | A | * | 2/1994 | Chen et al. ............... 29/603.18 |
| 5,285,340 | A |   | 2/1994 | Ju et al. |
| 5,325,254 | A |   | 6/1994 | Cooperrider |
| 5,649,351 | A |   | 7/1997 | Cole et al. |
| 5,831,801 | A | * | 11/1998 | Shouji et al. ............... 360/126 |
| 5,949,625 | A |   | 9/1999 | Sato et al. |
| 6,055,138 | A |   | 4/2000 | Shi |
| 6,118,629 | A |   | 9/2000 | Huai et al. |
| 6,156,375 | A |   | 12/2000 | Hu et al. |
| 6,172,848 | B1 |  | 1/2001 | Santini |
| 6,188,544 | B1 |  | 2/2001 | Mino |
| 6,282,056 | B1 |  | 8/2001 | Feng et al. |
| 6,307,707 | B1 | * | 10/2001 | Takano et al. ............... 360/122 |
| 6,317,290 | B1 |  | 11/2001 | Wang et al. |
| 6,414,825 | B1 | * | 7/2002 | Inoue et al. ............... 360/320 |
| 6,567,239 | B1 | * | 5/2003 | Hasegawa et al. .......... 360/126 |
| 6,724,572 | B1 | * | 4/2004 | Stoev et al. ............... 360/126 |
| 6,751,052 | B1 | * | 6/2004 | Tagawa et al. ............. 360/126 |
| 2002/0026704 | A1 | | 3/2002 | Stageberg et al. |
| 2002/0060878 | A1 | | 5/2002 | Kamijima |

FOREIGN PATENT DOCUMENTS

| JP | 07-110917 | 4/1995 |
| JP | 09-293210 | 11/1997 |
| JP | 2001-034911 | 2/2001 |
| JP | 2001-052311 | 2/2001 |
| JP | 2002-008207 | 1/2002 |
| JP | 2002-008208 | 1/2002 |

* cited by examiner

Primary Examiner—Angel Castro
(74) Attorney, Agent, or Firm—John J. Oskorep, Esq.

(57) ABSTRACT

A magnetic head which includes a pole piece with a double pedestal structure has improved overwrite capabilities and reduced fringing fields. The magnetic head has first and second pole pieces and a gap layer which separates the first and the second pole pieces. The first pole piece includes a first pole piece layer, a bottom pedestal portion formed over the first pole piece layer at an air bearing surface (ABS), and a top pedestal portion formed over the bottom pedestal portion. The top pedestal portion has a thickness that is no more than half of that of the bottom pedestal portion and a length that is no more than half of that of the bottom pedestal portion. Advantageously, a throat height of the magnetic head is reduced from use of the top pedestal portion whereas the mechanical reliability of the first pole piece is increased from use of the bottom pedestal portion.

28 Claims, 7 Drawing Sheets

MAGNETIC HEAD HAVING A POLE PIECE WITH A DOUBLE PEDESTAL STRUCTURE

BACKGROUND OF THE INVENTION

1. Field of the Invention

This invention relates generally to a magnetic head for a disk drive, and more particularly to a magnetic write head having a pole piece with a double pedestal structure.

2. Description of the Related Art

A write head is typically combined with a magnetoresistive (MR) or giant magnetoresistive (GMR) read head to form a merged head, certain elements of which are exposed at an air bearing surface (ABS). The write head comprises first and second pole pieces connected at a back gap that is recessed from the ABS. The first and second pole pieces terminate at the ABS where they define first and second pole tips, respectively. An insulation stack, which comprises a plurality of insulation layers, is sandwiched between the first and second pole pieces, and a coil layer is embedded in the insulation stack. A processing circuit is connected to the coil layer for conducting write current through the coil layer which, in turn, induces magnetic write fields in the first and second pole pieces. A non-magnetic gap layer is sandwiched between the first and second pole tips. Write fields of the first and second pole tips at the ABS fringe across the gap layer. In a magnetic disk drive, a magnetic disk is rotated adjacent to and a short distance (fly height) from the ABS so that the write fields magnetize the disk along circular tracks. The written circular tracks then contain information in the form of magnetized segments with fields detectable by the MR or GMR read head.

An MR read head includes an MR sensor sandwiched between first and second non-magnetic gap layers, and located at the ABS. The first and second gap layers and the MR sensor are sandwiched between first and second shield layers. In a merged MR head, the second shield layer and the first pole piece are a common layer. The MR sensor detects magnetic flux from the circular tracks of the rotating disk by a change in resistance that corresponds to the strength of the fields. A sense current is conducted through the MR sensor, where changes in resistance cause voltage changes that are received by the processing circuitry as readback signals.

A GMR read head includes a GMR sensor which manifests the GMR effect. In the GMR sensor, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. GMR sensors using only two layers of ferromagnetic material (e.g., nickel-iron, cobalt, or nickel-iron-cobalt) separated by a layer of nonmagnetic material (e.g., copper) are generally referred to as spin valve (SV) sensors manifesting the SV effect. Recorded data can be read from a magnetic medium because the external magnetic field from the recorded magnetic medium (the signal field) causes a change in direction of magnetization in the free layer, which in turn causes a change in resistance of the SV sensor and a corresponding change in the sensed current or voltage. A GMR head is typically associated with a design in which the second shield layer and first pole piece are not a common layer. These pieces are separated by a non-magnetic material, such as alumina, or a metal that can be deposited using a physical vapor deposition technique or an electro-plating technique, for example.

One or more heads may be employed in a magnetic disk drive for reading and writing information on circular tracks of a rotating disk. A merged head is mounted on a slider that is carried on a suspension. The suspension is mounted to an actuator which rotates the magnetic head to locations corresponding to desired tracks. As the disk rotates, an air layer (an "air bearing") is generated between the rotating disk and an air bearing surface (ABS) of the slider. A force of the air bearing against the air bearing surface is opposed by an opposite loading force of the suspension, causing the magnetic head to be suspended a slight distance (flying height) from the surface of the disk. Flying heights are typically less than 0.02 $\mu$m in today's disk drives.

Prior art described in U.S. Pat. No. 5,864,450 entitled "Ni45Fe55 Metal-In-Gap Thin Film Magnetic Head" teaches the utilization of an additional material on top of the pole tip which has a higher saturation magnetization than that of the material beneath it. This advantageously improves the write performance of the write head. However, this technique is limited in application to a write head which requires higher magnetic moment materials sputtered on top of the pole tip with a throat height being more or less aligned with the bottom pole tip. Prior art described in published U.S. patent application Ser. No. 20020191334 entitled "Magnetic Transducer With Pedestal Pole Piece Structure" teaches a writer structure having a sunken first layer coil to achieve a shorter yoke length for writer efficiency and a substantial planar surface to facilitate a top pole process having enhanced pole width control. As the throat height, typically about 2 $\mu$m, is defined by the bottom P1 pedestal, this structure suffers from mechanic reliability problems when the pedestal length is smaller than 0.5 $\mu$m, or the aspect ratio (pedestal height/pedestal length) is greater than 2.5. Thus, this prior art is not extendible to relatively short write throat applications.

Write heads must continuously be improved to provide better overwrite (OW) capabilities and reduced fringing fields as track pitch increases with reduced write track width and write gap. In FIG. 9, a graph 900 shows a three-dimensional finite-element calculation of deep gap field vs. the current-coil-turn product (where N is coil turns and I is current through the coil). As apparent from graph 900, a short throat height is imperative to achieve a high deep gap field for narrow track write heads, which corresponds to a higher write field for superior writeability.

What is needed is an improved write head design and apparatus which provides for a reduced throat height and a superior mechanical stability.

SUMMARY

As described herein, the present invention involves a magnetic write head having a pole piece with a double pedestal structure with a reduced throat height and improved mechanical stability. The magnetic head has first and second pole pieces and a gap layer which separates the first and the second pole pieces. The first pole piece includes a first pole piece layer, a bottom pedestal portion formed over the first pole piece layer at an air bearing surface (ABS), and a top pedestal portion formed over the bottom pedestal portion. The top pedestal portion has a thickness that is no more than half of that of the bottom pedestal portion and a length that is no more than half of that of the bottom pedestal portion. Advantageously, a throat height of the magnetic head is reduced from use of the top pedestal portion whereas the mechanical reliability of the first pole piece is increased from use of the bottom pedestal portion.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and MR magnetic read head and non-pedestal write head as seen in plane V—V of FIG. 2;

DETAILED DESCRIPTION OF THE PREFERRED EMBODIMENTS

The following description are preferred embodiments presently contemplated for carrying out the present invention. This description is made for the purpose of illustrating the general principles of the present invention and is not meant to limit the inventive concepts claimed herein.

Figure 1:
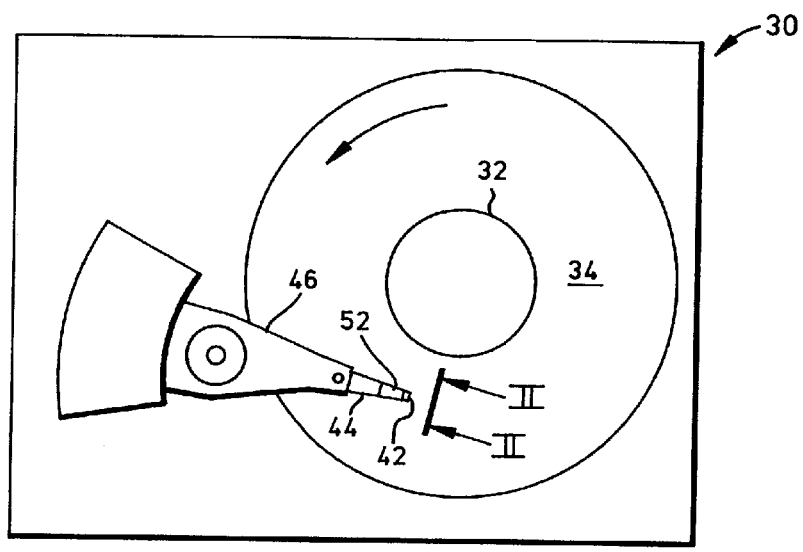
FIG. 1 is a planar view of an exemplary magnetic disk drive.
Figure 2:
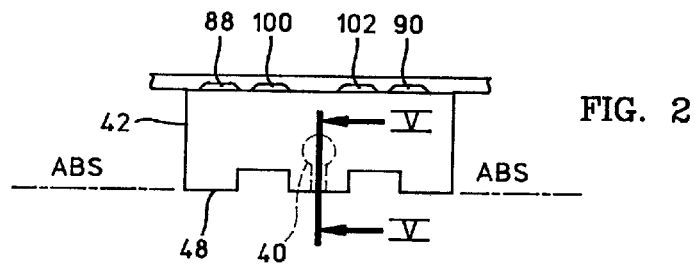
FIG. 2 is an end view of a slider with a magnetic head of the disk drive as seen in plane II—II.
Figure 3:
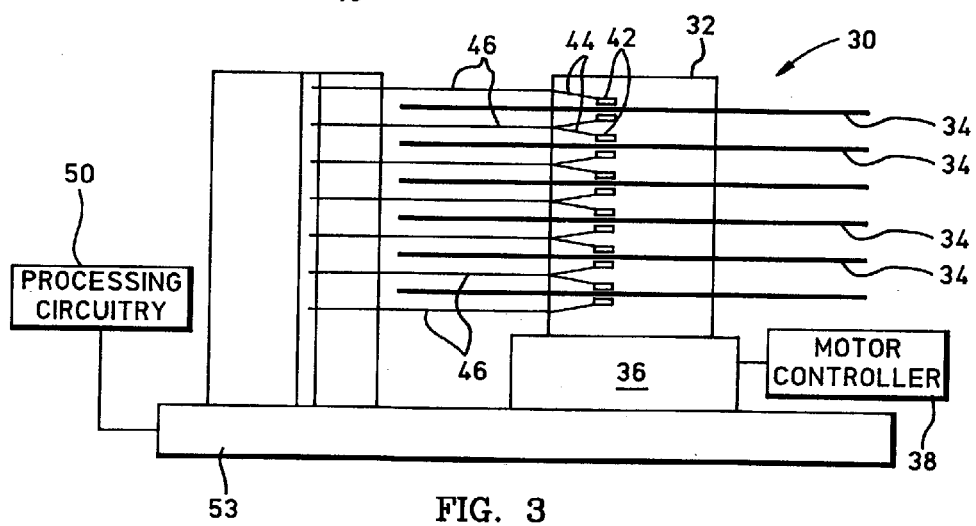
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1–3 a conventional magnetic disk drive 30. Drive 30 includes a spindle 32 that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by motor 36, slider 42 is supported on a thin (typically, 0.05 $\mu$m) cushion of air (air bearing) between the disk and an air bearing surface (ABS) 48.

Figure 4:
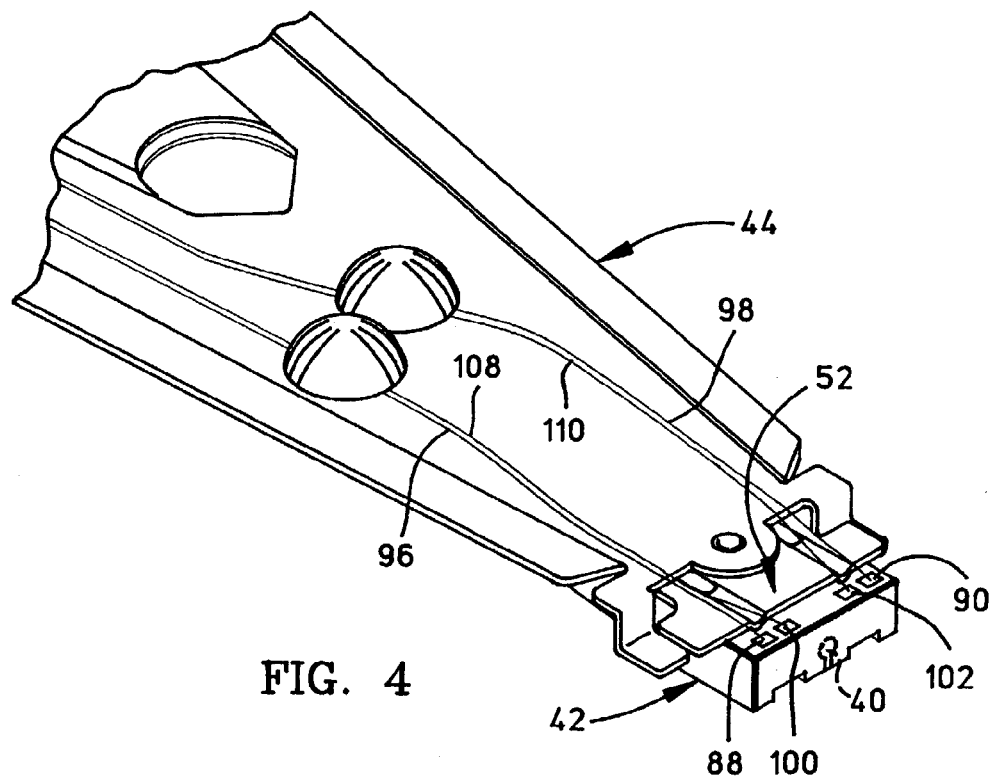
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with magnetic head 40, provides motor drive signals, and also provides control signals for moving slider 42 to various tracks. In FIGS. 1 and 4, slider 42 is shown mounted to a head gimbal assembly (HGA) 52 that is mounted to suspension 44. All of the above components are supported on a base 53.

FIG. 5 is a side cross-sectional elevation view of a conventional merged magnetoresistive (MR) head 40 having a write head portion 54 (non-pedestal type) and a read head portion 56. Read head portion 56 includes an MR sensor 58. MR sensor 58 is sandwiched between first and second gap layers 60 and 62 that are, in turn, sandwiched between first and second shield layers 64 and 66. In response to external magnetic fields, the resistance of MR sensor 58 changes. A sense current conducted through the sensor causes these resistance changes to be manifested as potential changes, which are processed by processing circuitry 50 shown in FIG. 3.

Figure 6:
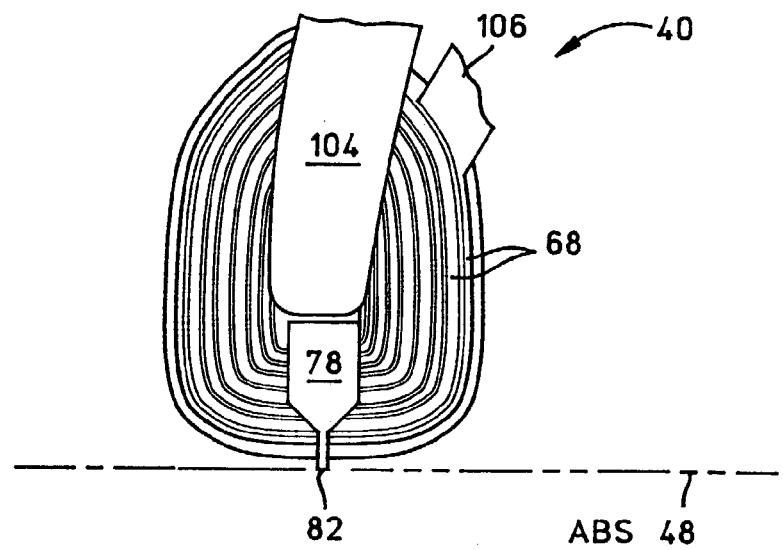
FIG. 6 is a top view of the second pole piece and coil layer, a portion of which is shown in FIG. 5, with all insulation material removed.
Figure 7:
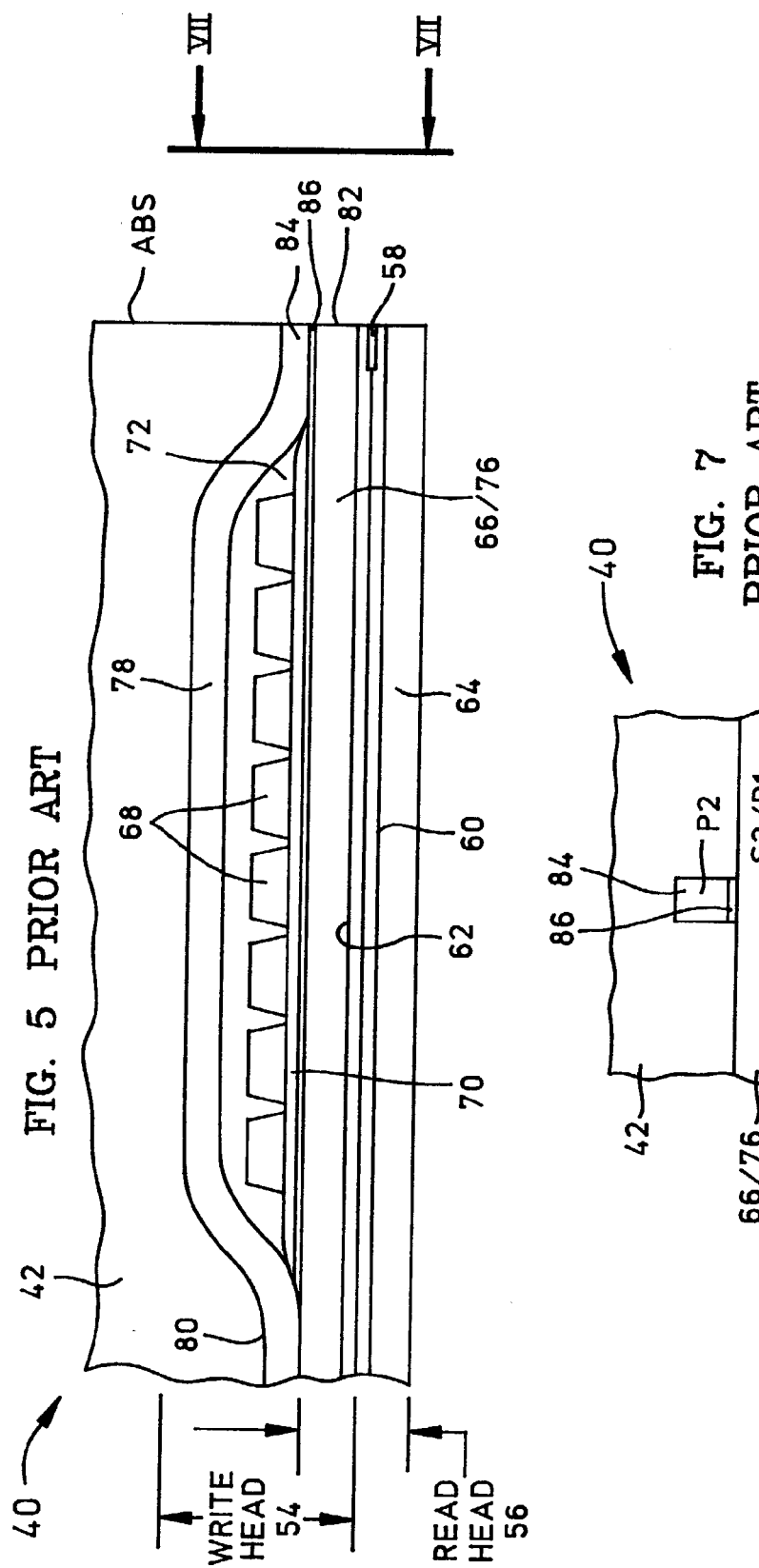
FIG. 7 is a partial ABS view of the slider taken along plane VII—VII of FIG. 5 to show the read and write elements of the magnetic head.

Write head portion 54 of the head includes a coil layer 68 sandwiched between first and second insulation layers 70 and 72. First and second insulation layers 70 and 72 are referred to as an "insulation stack". Coil layer 68 and first and second insulation layers 70 and 72 are sandwiched between first and second pole pieces 76 and 78. First and second pole pieces 76 and 78 are magnetically coupled at a back gap 80, and have first and second pole tips 82 and 84 that are separated by a non-magnetic gap layer 86 at the ABS. As shown in FIGS. 2 and 4, first and second solder connections 88 and 90 connect leads (not shown) from MR sensor 58 to leads 96 and 98 on suspension 44; third and fourth solder connections 100 and 102 connect leads 104 and 106 from coil 68 (see FIG. 6) to leads 108 and 110 on the suspension.

Figure 8:
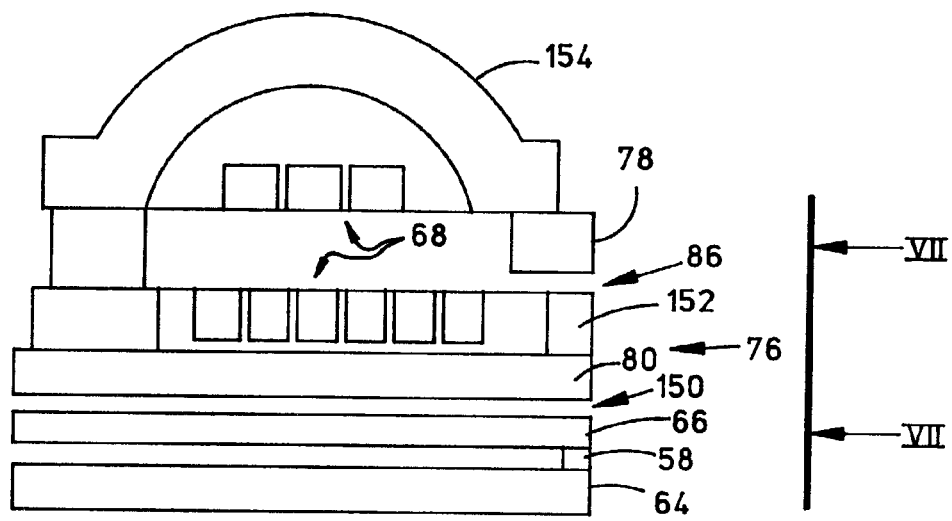
FIG. 8 is a partial elevation view of the slider and magnetic head as seen in plane V—V of FIG. 2, where the magnetic head includes a GMR read head portion and a pedestal write head.
Figure 9:
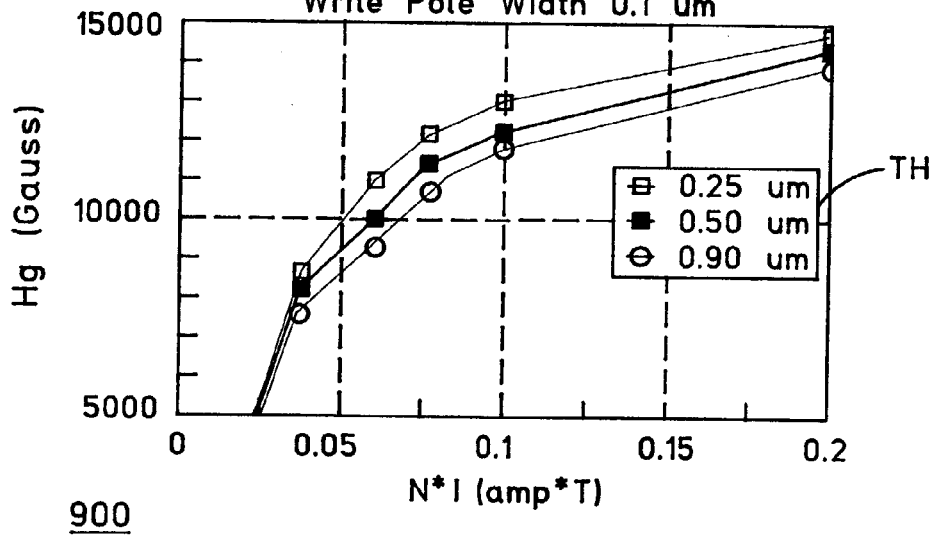
FIG. 9 is a graph which shows a three dimensional finite-element calculation of deep gap field versus current-coil-turn product with varying throat height defined by the second pedestal.

FIG. 8 is a partial cross-sectional view of the conventional slider and magnetic head as seen in plane V—V of FIG. 2, where the magnetic head may include an MR or GMR sensor. Although many components in this head are the same as those in FIG. 5, some differences are apparent. For one, the head in FIG. 8 includes a pedestal-type write head wherein first pole piece 76 consists of a first pole piece layer 80 and a plated pedestal 152. Plated pedestal 152 is formed on first pole piece layer 80 by electro-plating and is made of a magnetic material with a high magnetic moment. Also, shield layer 66 and first pole piece layer 80 are not common layers; they are separate. Gap layer 86 separates plated pedestal 152 from second pole piece 84. A separating layer 150 may be formed between shield layer 66 and first pole piece layer 80. Finally, a third pole piece 154, which is formed on top of second pole piece 84, serves as a magnetic flux connecting layer.

Figure 10:
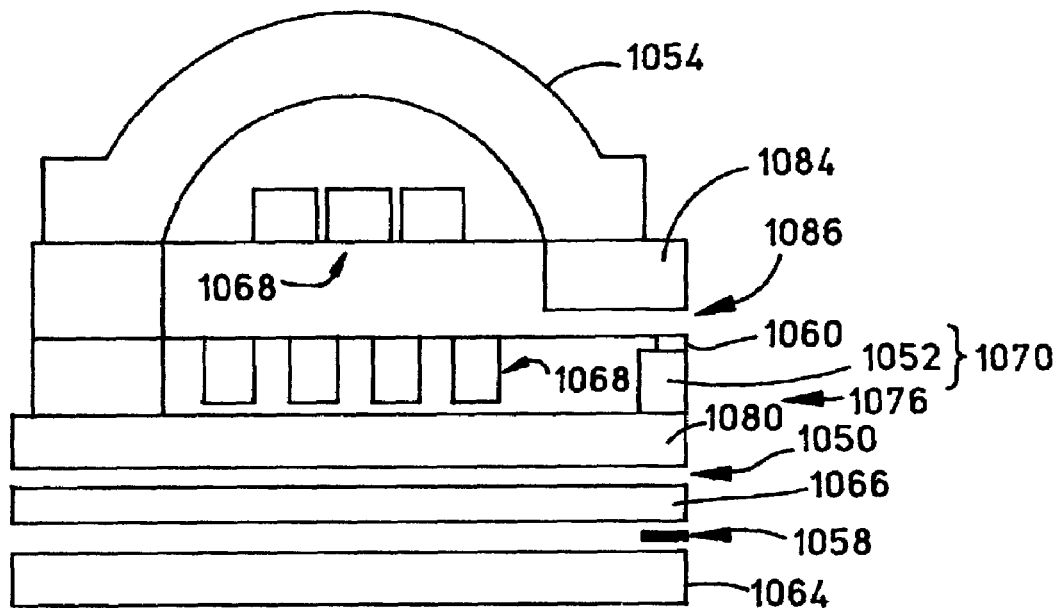
FIG. 10 is a partial elevation view of the slider and magnetic head of the present application, which includes a GMR sensor.
Figure 11:
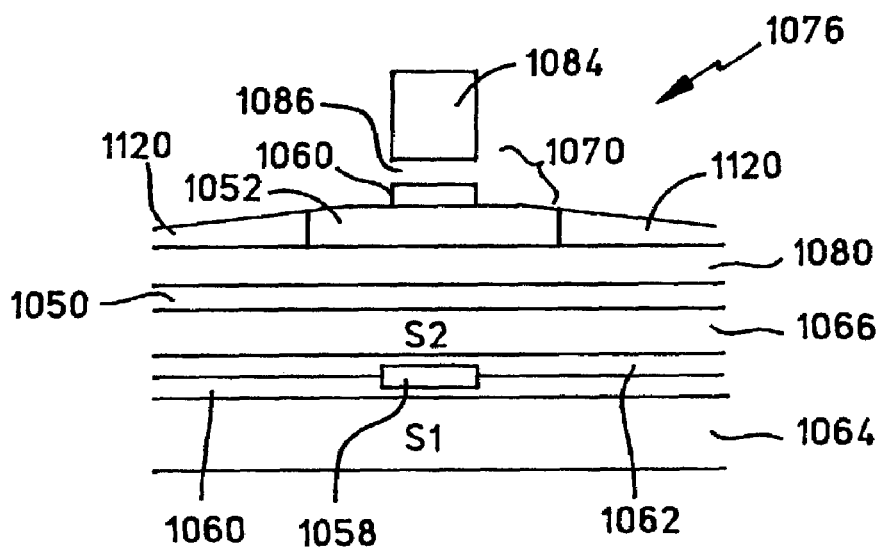
FIG. 11 is a partial ABS view of the slider to show the read and write elements of the magnetic head of the present application of FIG. 10, which here includes the GMR sensor.

FIG. 10 shows a partial cross-sectional view of a magnetic head in accordance with one embodiment of the present invention. In this embodiment, the magnetic head is of the GMR type. FIG. 11 shows the same magnetic head in a partial ABS view. The magnetic head generally includes a first pole piece 1076 and a second pole piece 1084. First pole piece 1076 includes a first pole piece layer 1080 and a double pedestal structure 1070 formed on top of first pole piece layer 1080. Double pedestal structure 1070 is separated from the pole tip of second pole piece 1084 by a gap layer 1086. Double pedestal structure 1070 includes a bottom pedestal portion 1052 and a top pedestal portion 1060. As shown in FIG. 11, an insulator material 1120 surrounds bottom pedestal portion 1052. Although double pedestal structure 1070 is shown as having two pedestal layers, other additional or intervening layers may be utilized without adversely affecting its properties to form a multilayer pedestal structure having more than two layers. A separation layer 1050 separates a second shield layer 1066 from first pole piece 1076. A third pole piece 1054, which serves as a magnetic connecting layer, is formed on top of second pole piece 1084. Conventional write coils 1068 are also formed within the magnetic head. A GMR sensor 1058 is sandwiched in between first and second shield layers 1064 and 1066. One skilled in the art will understand that variations on the magnetic heads shown and described above are also available.

First pole piece 1076 and second pole piece 1084 may be made of any suitable magnetic material, preferably one with a high magnetic moment, such as various compositions of NiFe alloys, CoFe alloys, or FeAlN, with the inclusion of other common additives or dopants to control its material properties. Gap layer 1086 may be made of alumina ($Al_2O_3$) or other suitable non-magnetic material. The thickness of gap layer 1086 preferably varies between about 100 and 2000 Angstroms, and in the present embodiment it has a thickness of about 1000 Angstroms. As shown in FIG. 11, an insulator material 1120, which is optional, surrounds bottom pedestal portion 1052. One skilled in the art will understand that variations on the magnetic heads shown and described above are also available. Although double pedestal structure 1070 is shown as having two pedestal layers, other additional or intervening layers may be utilized without adversely affecting its properties to form a multilayer pedestal structure having more than two layers.

As described, double pedestal structure 1070 includes bottom pedestal portion 1052 and top pedestal portion 1060. Bottom pedestal portion 1052 is an electrically plated structure and therefore may be referred to as a plated pedestal. Bottom pedestal portion 1052 is made from a magnetic material, preferably with a relatively high magnetic moment, between about 1.7 and 2.5 Tesla, for example. Bottom pedestal portion 1052 may be made from any suitable material, such as various compositions of NiFe alloys, CoFe alloys, or FeAlN, with the inclusion of other common additives or dopants to control its material properties. Bottom pedestal portion 1052 is surrounded by insulator materials 1120, such as alumina ($Al_2O_3$) or cured photoresist.

Figure 12:
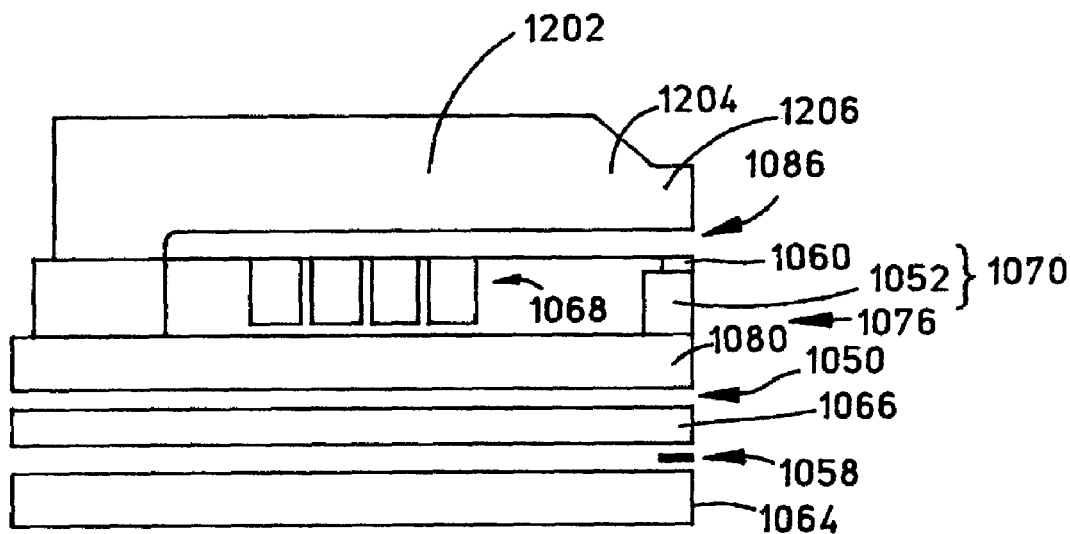
FIG. 12 is a partial elevation view of another embodiment of the slider and magnetic head of the present application.

Top pedestal portion 1060 is formed directly on bottom pedestal portion 1052 and lies directly underneath gap layer 1086. Top pedestal portion 1060 is formed over bottom pedestal portion 1052 by sputter deposition, but another suitable technique such as electro-plating may be utilized as described herein. Also, top pedestal portion 1060 has been notched by ion milling, resulting in straight or angled side walls. Top pedestal portion 1060 is made from a magnetic material, preferably having a relatively high magnetic moment, between about 1.7 and 2.5 Tesla, for example. Top pedestal portion 1060 may be made from any suitable material, such as various compositions of NiFe alloys, CoFe alloys, or FeAlN, with the inclusion of other common additives or dopants to control its material properties. As one ordinarily skilled in the art will appreciate, the P2 structure may be varied with use of the same or similar double P1 pedestal structure as shown in FIG. 12.

Figure 13:
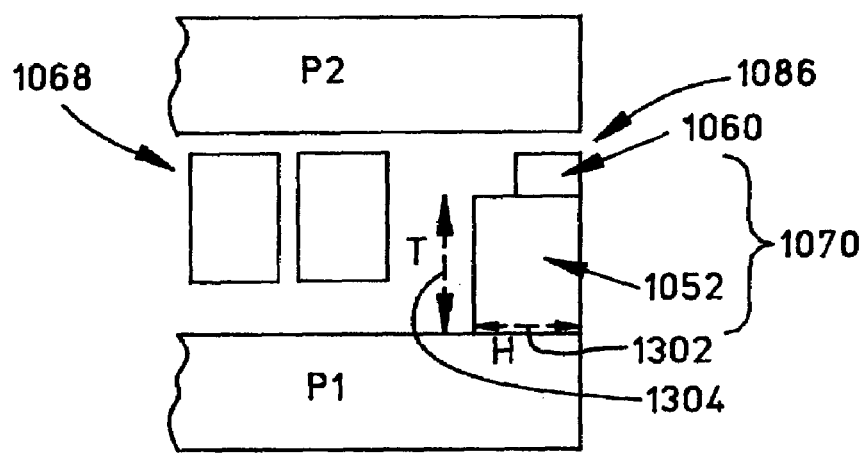
FIG. 13 is a partial close-up cross-section of the magnetic head, showing definitions of thickness and height.

A representative example of the dimensions of bottom pedestal portion 1052, top pedestal structure 1060, and gap 1086 relative to one another are shown in FIG. 13. A thickness definition 1304 and a height definition 1302 for double pedestal structure 1070 are shown in this close-up cross section. In general, the thickness of bottom pedestal portion 1052 is generally at least two (2) times the thickness of top pedestal portion 1060 (i.e. the thickness of top pedestal portion 1060 is no more than half of the thickness of bottom pedestal portion 1052). For example, the thickness of bottom pedestal portion 1052 is preferably between about 0.5–6.0 $\mu$m, and in the present embodiment has a particular thickness of about 3.0 $\mu$m. More preferably, the thickness of bottom pedestal portion 1052 is at least four (4) times the thickness of top pedestal portion 1060 (i.e. the thickness of top pedestal portion 1060 is no more than a quarter of the thickness of bottom pedestal portion 1052). Also, the thickness of top pedestal portion 1060 is related or linked to the thickness of gap layer 1086. Preferably, the thickness of top pedestal portion 1060 is at least the thickness of gap layer 1086 (i.e. equal to or greater than the gap layer's thickness). For example, the thickness of top pedestal portion 1060 is preferably between 0.05 to 1 $\mu$m (with the thickness of gap layer 1086 being about 0.04 to 0.10 $\mu$m). On the other hand, the height of bottom pedestal portion 1052 is generally at least two (2) times the height of top pedestal portion 1060 (i.e. the height of top pedestal portion 1060 is no more than half of the height of bottom pedestal portion 1052). For example, the height of bottom pedestal portion 1052 is greater than 2 $\mu$m, and more particularly between about 2 $\mu$m and 6 $\mu$m; the height of top pedestal 1060 is less than 3 $\mu$m, and more particularly between about 3 $\mu$m and 0.05 $\mu$m.

In one specific example of the dimensions of double pedestal structure 1070, the thickness of top pedestal portion 1060 is about 0.25 $\mu$m and its height is about 0.5 $\mu$m; the thickness of bottom pedestal portion 1052 is about 2 $\mu$m and its height is about 1.5 $\mu$m; the thickness of gap layer 1086 is about 0.08 $\mu$m.

A method of making a magnetic head of the present application will now be described in relation to FIGS. 14A–14D. The specific materials, material thicknesses, material properties, etc. described above in relation to FIGS. 10–13 may be applied in these methods, although they may not explicitly mentioned in the text below; one ordinarily skilled in the art will appreciate that other variations may be realized as well.

Figure 14A:
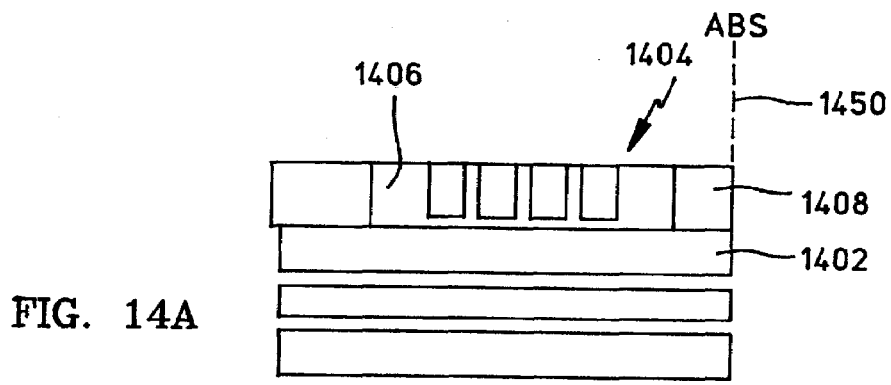
FIGS. 14A–14D are a series of illustrations used to describe one method of making a magnetic head of the present application.

Beginning with FIG. 14A, a first pole piece layer 1402 ("P1") is formed on a substrate by frame plating. The substrate may be any underlying component or layer, such as a shield layer (which is covered by an insulator layer) or a second gap layer. Next, write coils 1404 are formed over an insulator on top of first pole piece layer 1402. Write coils 1404 are protected with a surrounding insulator 1406, which may be a hard bake resist, alumina ($Al_2O_3$), or other suitable insulative material. A pedestal 1408 is then frame plated over first pole piece layer 1402 after etching away insulator materials in front and in the back gap regions. Pedestal 1408 may be made of a single material, such as a high $M_s$ material, or a dual layer such as a top layer of cobalt-iron (CoFe) and a bottom layer of nickel-iron (NiFe). Preferably, pedestal 1408 is initially plated to have a thickness of between about 1.5–7.0 $\mu$m, for example to a thickness of about 4.0 $\mu$m. Another insulator (not shown in FIG. 14A), which may be alumina, hard bake resist, or other suitable insulative material, is then deposited over first pole piece layer 1402 and pedestal 1408. A CMP is then performed on a top surface of the structure to remove top insulator materials and to expose a top of pedestal 1408 such that the top surfaces of insulator 1406 and pedestal 1408 are generally coplanar. The coil can be either coplanar with CMP surface or embodied in the insulation. The resulting structure is shown in FIG. 14A.

Figure 14B:
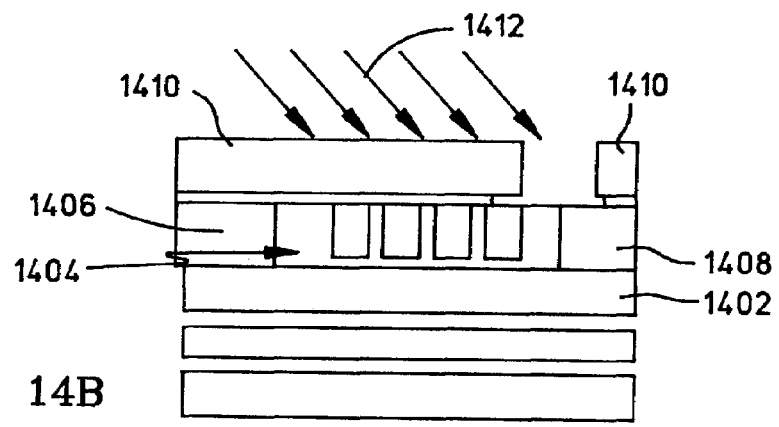

In FIG. 14B, a photoresist mask 1410 is formed to define the geometry of a top pedestal portion to be formed from pedestal 1408. In this embodiment, photoresist mask 1410 includes a top photoresist layer and a bottom release layer (such as PMGI) underneath the photoresist layer. The formation and placement of photoresist mask 1410 (an example of which is shown) determines the throat height, which is set to provide the desired write head performance considering its impact on the fabrication of the second pole piece. In this embodiment, one portion of photoresist mask 1410 is placed very close to the ABS and another portion of it over the back gap and coils 1404, such that a rear portion of pedestal 1408 is exposed. Such placement provides a tighter control on the zero throat height of the head. Next, ion milling is performed as indicated by arrows 1412 to remove the exposed portion of pedestal 1408. In this approach, the lack of a fabrication-related interface between 1052 and 1060 improves the mechanical reliability of 1060.

Figure 14C:
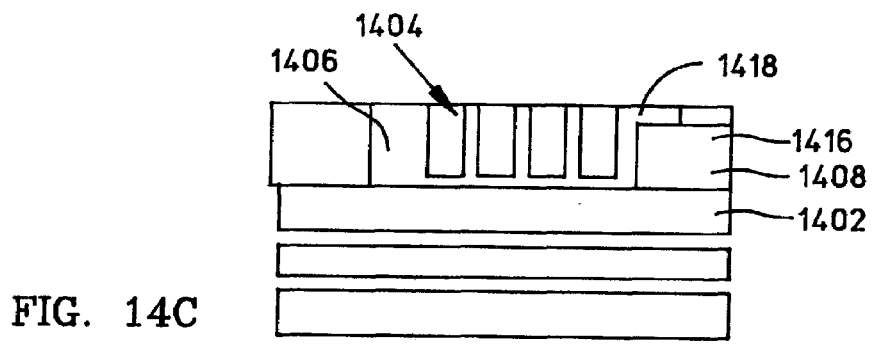

In FIG. 14C, a top pedestal portion 1416 formed underneath the mask from the ion milling of pedestal 1408 is shown. This top pedestal portion 1416 is the top pedestal portion of the double pedestal structure of the present application; the remaining pedestal 1408 beneath top pedestal portion 1416 becomes the bottom pedestal portion of the double pedestal structure. An insulator layer 1418 is then deposited over this structure which includes the photoresist mask 1410 (FIG. 14B). Insulator layer 1418 may be made of alumina ($Al_2O_3$), $SiO_2$, other suitable dielectric material. The thickness of insulator layer 1418 is targeted to match the thickness of top pedestal portion 1416, in order to ensure planarity of the final structure. This deposition is suitably controlled in time or by an end point detection technique such that a top surface of insulator layer 1418 becomes substantially flush with a top surface of top pedestal portion 1416. These surfaces together form a substantially planar top surface as shown. Next, the photoresist mask 1410 (FIG. 14B) is removed using a suitable solvent to dissolve its release layer. A light CMP may be performed on this entire top surface to ensure its planarity or to fix any irregularities. The resulting structure is shown in FIG. 14C. Advantageously, the top and bottom pedestal portions are formed from the same pedestal structure.

Figure 14D:
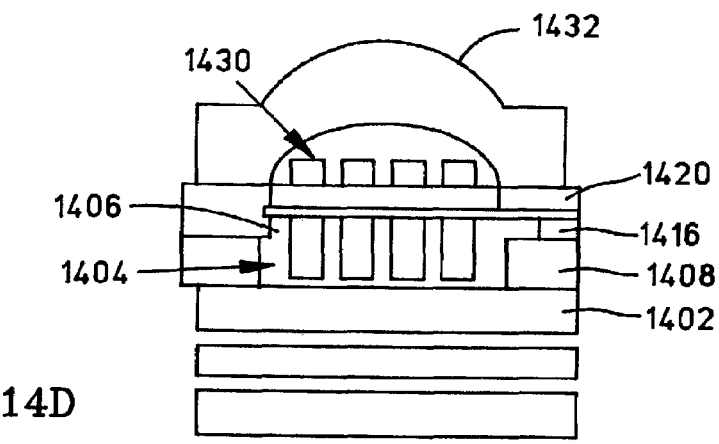

In FIG. 14D, a gap layer 1422 is then deposited over the entire structure, including over top pedestal portion 1416 and insulator layer 1418. Since gap layer 1422 was deposited over a substantially planar surface, gap layer 1422 also has a substantially planar top surface. A second pole piece 1420 ("P2") is then formed over that portion of gap layer 1422 that resides above the pole tip as shown. After P2 is formed, top pedestal portion 1416 may be notched using conventional ion milling techniques where the second pole piece 1420 is used as a milling mask. Other conventional steps may complete formation of the magnetic head. For example, a second coil layer (and perhaps additional coil layers) 1430 is subsequently formed, followed by the formation of a third pole piece ("P3") 1432 which is a magnetic flux connecting layer positioned on top of P2 and (optionally) recessed from the ABS. The resulting structure is shown in FIG. 14D, which may have one of the ABS views shown in FIG. 10, 12, or 13. Bottom pedestal portion 1408 and top pedestal portion 1416 form the double pedestal structure of the present application.

Thus, a magnetic head having improved writing capabilities, such as an improved overwrite (OW) capability and reduced fringing fields, has been described. Such a magnetic head includes a first pole piece, a second pole piece, and a gap layer in between the first and the second pole pieces. The first pole piece includes a first pole piece layer, a bottom pedestal portion formed over the first pole piece layer at an air bearing surface (ABS), and a top pedestal portion formed over the bottom pedestal portion. The top pedestal portion has a thickness that is no more than half of that of the bottom pedestal portion and a length that is no more than half of that of the bottom pedestal portion. Advantageously, a throat height of the magnetic head is reduced from use of the top pedestal portion whereas the mechanical reliability of the first pole piece is increased from use of the bottom pedestal portion. The value of the throat height is optimized to provide the desired write head performance considering its impact on the fabrication of the second pole piece. In the method of making described herein, the formation and position of the photoresist mask's edge determines the preferred top pedestal throat height.

It is to be understood that the above is merely a description of preferred embodiments of the invention and that various changes, alterations, and variations may be made without departing from the true spirit and scope of the invention as set for in the appended claims. For example, although the double pedestal structure has been shown to have two pedestal layers, other additional or intervening layers may be utilized without adversely affecting its properties to form a multilayer pedestal structure having more than two layers. Few if any of the terms or phrases in the specification and claims has been given any special particular meaning different from the plain language meaning, and therefore the specification is not to be used to define terms in an unduly narrow sense.

What is claimed is:
1. A magnetic head, comprising:
   a first pole piece;
   a second pole piece;
   a gap layer which separates the first and the second pole pieces;
   the first pole piece having:
      a first pole piece layer;
      a bottom pedestal portion formed over the first pole piece layer at an air bearing surface (ABS);
      a top pedestal portion formed over the bottom pedestal portion;
      the top pedestal portion having a thickness that is no more than half of that of the bottom pedestal portion; and
      the top pedestal portion having a height that is no more than half of that of the bottom pedestal portion.
2. The magnetic head of claim 1, wherein a throat height of the magnetic head is defined by the height of the top pedestal portion.
3. The magnetic head of claim 1, wherein a mechanical reliability of the first pole piece is increased from the height of the bottom pedestal portion.
4. The magnetic head of claim 1, wherein a throat height of the magnetic head is defined by the height of the top pedestal portion and a mechanical reliability of the first pole piece is increased by the height of the bottom pedestal portion.
5. The magnetic head of claim 1, wherein a writing efficiency of the magnetic head is increased by use of the top pedestal portion.

6. The magnetic head of claim 1, wherein the top pedestal portion comprises magnetic material.

7. The magnetic head of claim 1, wherein the height of the top pedestal portion is less than 1.0 μm.

8. The magnetic head of claim 1 wherein the top pedestal portion has a thickness that is no greater than a quarter of that of the bottom pedestal portion.

9. The magnetic head of claim 1, further comprising:
write coils;
an insulator material surrounding the write coils; and
the gap layer being formed over the insulator material and the top pedestal portion.

10. The magnetic head of claim 1, further comprising:
write coils;
an insulator material surrounding the write coils;
the gap layer being formed over the insulator material and the top pedestal portion; and
the second pole piece formed over the gap layer at the ABS.

11. A magnetic recording device, comprising:
at least one rotatable magnetic disk;
a spindle for use in supporting the at least one rotatable magnetic disk;
a disk drive motor for use in rotating the at least one rotatable magnetic disk;
a magnetic head for use in writing data to the at least one rotatable magnetic disk;
a slider for use in supporting the magnetic head;
the magnetic head including:
the first pole piece having:
a first pole piece layer;
a bottom pedestal portion formed over the first pole piece layer at an air bearing surface (ABS);
a top pedestal portion formed over the bottom pedestal portion;
the top pedestal portion having a thickness that is no more than half of that of the bottom pedestal portion; and
the top pedestal portion having a height that is no more than half of that of the bottom pedestal portion.

12. The magnetic recording device of claim 11, wherein a throat height of the magnetic head is defined by the height of the top pedestal portion.

13. The magnetic recording device of claim 11, wherein a mechanical reliability of the first pole piece is increased from the height of the bottom pedestal portion.

14. The magnetic recording device of claim 11, wherein a throat height of the magnetic head is defined by the height of the top pedestal portion and a mechanical reliability of the first pole piece is increased by the height of the bottom pedestal portion.

15. The magnetic recording device of claim 11, wherein a writing efficiency of the magnetic head is increased by use of the top pedestal portion.

16. The magnetic recording device of claim 11, wherein the top and the bottom pedestal portions are formed from the same pedestal structure.

17. The magnetic recording device of claim 11 wherein the top pedestal portion has a thickness that is no greater than a quarter of that of the bottom pedestal portion.

18. The magnetic recording device of claim 11, further comprising:
write coils;
an insulator material surrounding the write coils; and
the gap layer being formed over the insulator material and the top pedestal portion.

19. A magnetic head, comprising:
a first pole piece;
a second pole piece;
a gap layer which separates the first and the second pole pieces;
the first pole piece having:
a first pole piece layer;
a bottom pedestal portion formed over the first pole piece layer at an air bearing surface (ABS);
a top pedestal portion formed over the bottom pedestal portion;
the top pedestal portion having a thickness that is no greater than half of that of the bottom pedestal portion;
the top pedestal portion having a height that is no more than half of that of the bottom pedestal portion; and
a throat height of the magnetic head being defined substantially by the height of the top pedestal portion.

20. The magnetic head of claim 19, wherein a throat height of the magnetic head is defined by the height of the top pedestal portion and a mechanical reliability of the first pole piece is increased by the greater height of the bottom pedestal portion.

21. The magnetic head of claim 19, wherein a writing efficiency of the magnetic head is increased by the relatively smaller height of the top pedestal portion.

22. The magnetic head of claim 19, wherein a mechanical reliability of the first pole piece is increased by the relatively larger height of the bottom pedestal portion.

23. The magnetic head of claim 19, wherein the top pedestal portion comprises magnetic material.

24. The magnetic head of claim 19, wherein the height of the top pedestal portion is less than 1.0 μm.

25. The magnetic head of claim 19, further comprising:
write coils;
an insulator material surrounding the write coils; and
the gap layer being formed over the insulator material and the top pedestal portion.

26. The magnetic head of claim 19, further comprising:
write coils;
an insulator material surrounding the write coils;
the gap layer being formed over the insulator material and the top pedestal portion; and
the second pole piece formed over the gap layer at the ABS.

27. The magnetic head of claim 19, wherein the top pedestal portion has a thickness that is no greater than a quarter of that of the bottom pedestal portion.

28. The magnetic head of claim 19, wherein the top and the bottom pedestal portions are formed from the same pedestal structure.

* * * * *